United States Patent [19]

Bartholomew

[11] Patent Number: 4,805,467
[45] Date of Patent: Feb. 21, 1989

[54] FORCE RECORDING SEAT BELT ASSEMBLY

[75] Inventor: Donald D. Bartholomew, Marine City, Mich.

[73] Assignee: Proprietary Technology, Inc., Mt. Clemens, Mich.

[21] Appl. No.: 63,102

[22] Filed: Jun. 17, 1987

Related U.S. Application Data

[63] Continuation-in-part of Ser. No. 776,643, Sep. 16, 1985, Pat. No. 4,677,861.

[51] Int. Cl.$^4$ .......................... G01D 1/12; G04F 7/00
[52] U.S. Cl. ................................ 73/862.54; 116/203; 368/1
[58] Field of Search ........... 73/862.54, 862.53, 862.51, 73/862.39; 116/203, 206, 212; 368/1, 89; 267/74, 165

[56] References Cited

U.S. PATENT DOCUMENTS

| | | | |
|---|---|---|---|
| 834,843 | 10/1906 | O'Connor | 73/862.51 |
| 2,385,116 | 9/1945 | Trimbach | 73/862.53 |
| 2,723,560 | 11/1955 | Exline | 73/862.51 |
| 3,018,611 | 1/1962 | Biritz | 116/206 |
| 3,049,774 | 8/1962 | Rhodes et al. | 267/74 X |
| 3,428,362 | 2/1969 | Bertelson et al. | |
| 3,438,674 | 4/1969 | Radke et al. | |
| 3,692,361 | 9/1972 | Ivarsson . | |
| 3,717,991 | 2/1973 | Klar | 368/1 |
| 3,874,694 | 4/1975 | Stephenson | 340/52 E |
| 3,885,428 | 5/1975 | Dalferth . | |
| 3,908,452 | 9/1975 | Rieger . | |
| 4,103,640 | 8/1978 | Feder | 73/492 |
| 4,111,459 | 9/1978 | Magyar . | |
| 4,129,321 | 12/1978 | Garvey . | |
| 4,424,509 | 1/1984 | Andres et al. | 116/203 |
| 4,457,251 | 7/1984 | Weman et al. . | |

FOREIGN PATENT DOCUMENTS

| | | | |
|---|---|---|---|
| 2436325 | 4/1975 | Fed. Rep. of Germany | 280/805 |
| 2508728 | 9/1976 | Fed. Rep. of Germany . | |
| 1433618 | 4/1976 | United Kingdom . | |

Primary Examiner—Charles A. Ruehl
Attorney, Agent, or Firm—Harness, Dickey & Pierce

[57] ABSTRACT

A safety belt assembly of the present invention measures the amount of force exerted on the assembly and also the point in time when a force was exerted on the assembly. The assembly includes a first and second member associated with one another, mechanism associated with the first and second members for resiliently restraining relative movement and movably retaining said members with respect to one another; a mechanism responsive to relative movement of the first and second members for enabling a measurement of force and indicating a point in time when a force was exerted on the assembly; and a mechanism for securing the assembly to a safety belt and/or a buckle or anchor.

16 Claims, 3 Drawing Sheets

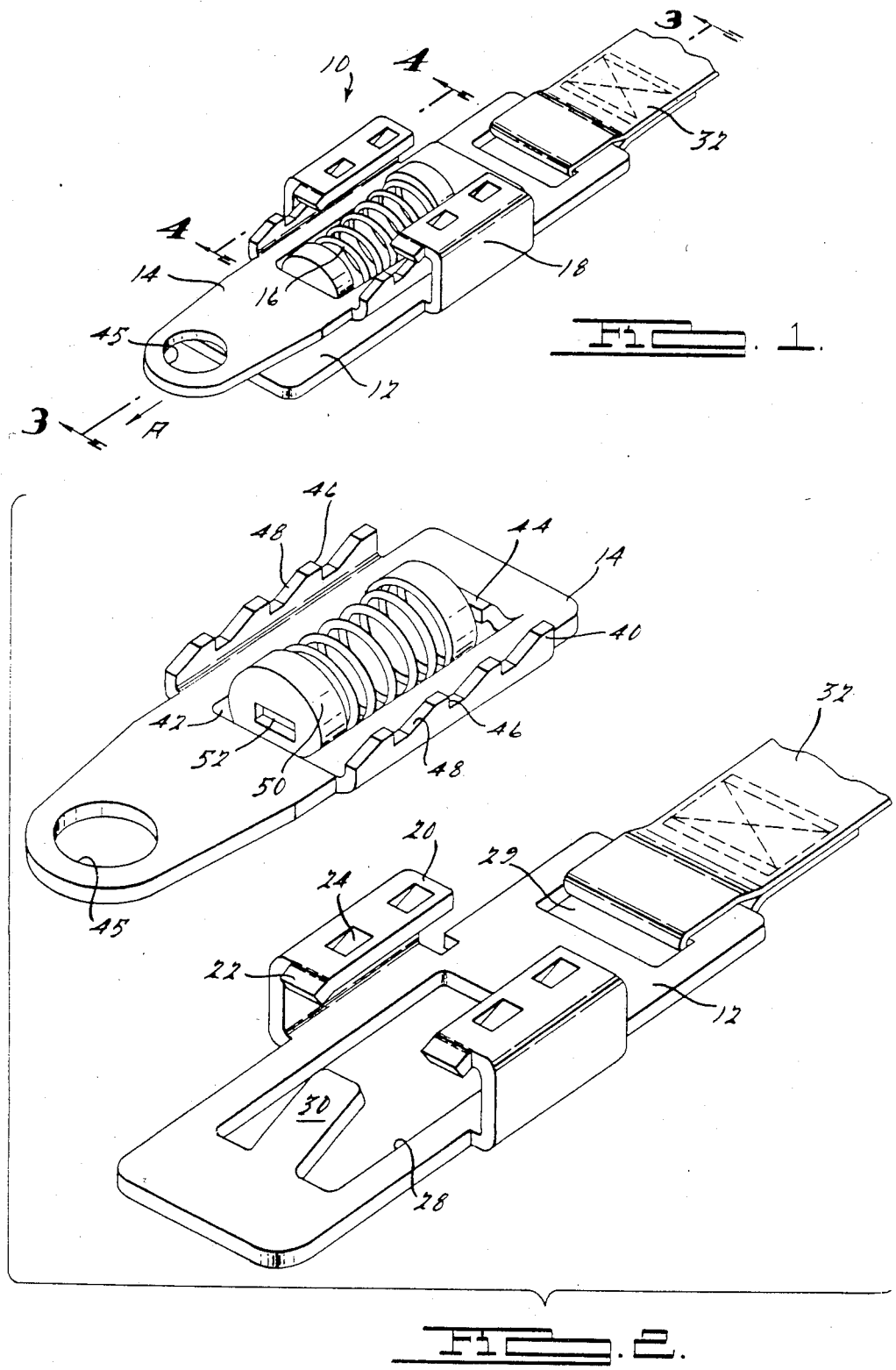

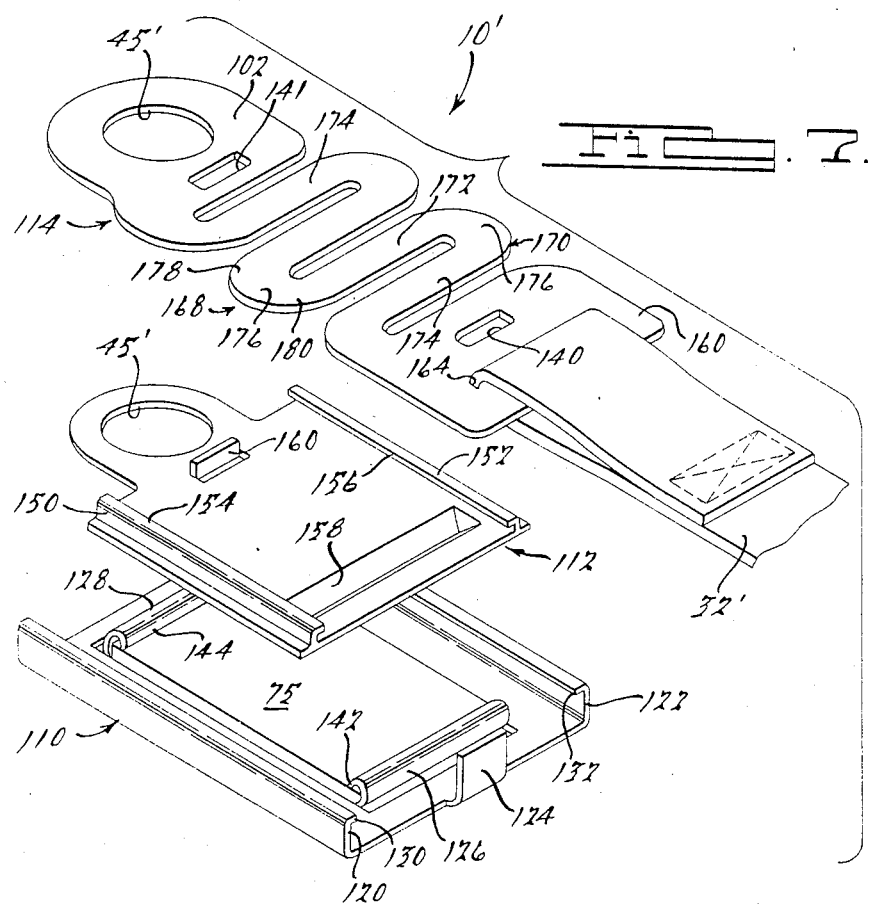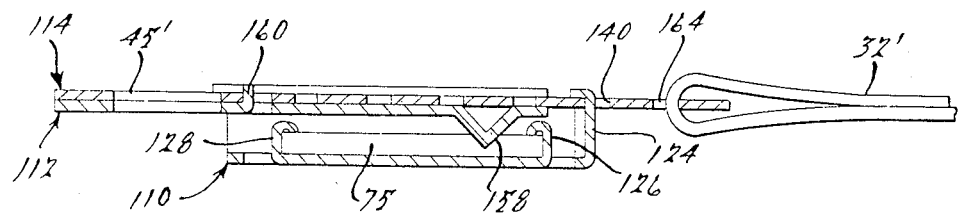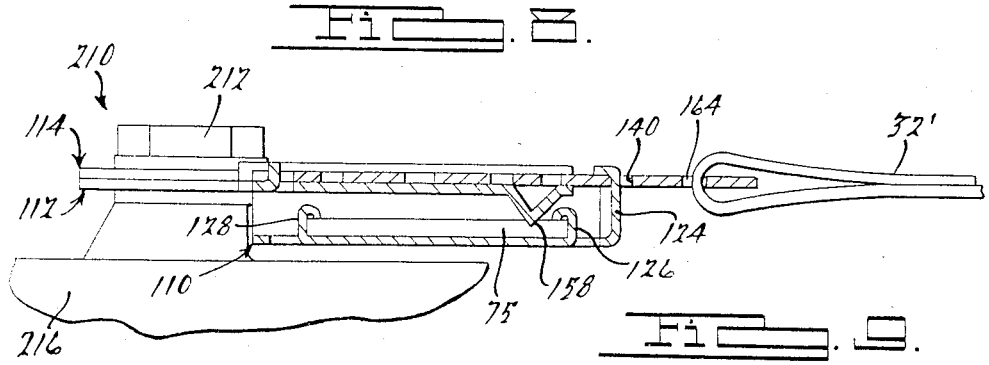

4,805,467

FORCE RECORDING SEAT BELT ASSEMBLY

RELATED APPLICATIONS

This application is a continuation-in-part application of U.S. patent application Ser. No. 776,643, filed Sept. 16, 1985, entitled Force Recording Seat Belt Assembly now U.S. Pat. No. 4,677,861.

TECHNICAL FIELD

The present invention generally relates to the field of seat belt assemblies and, more specifically, to seat belt assemblies having devices for measuring the force exerted on the belt during collisions and for indicating when the collision took place.

BACKGROUND AND SUMMARY OF THE INVENTION

Several industries, including motor vehicle, transportation and insurance, desire to have a device in the safety belt system of a motor vehicle which will indicate whether or not the safety belt was worn during an impact collision. Also, if the device was worn, when the collision occurred. In the past, the loading could only be determined when the belt was abraded, chafed or if the metal supports were bent or broken. However, many vehicle collisions are not severe enough as to bend or break the metal supports since they are made of very durable material. Thus, by a visual examination of a built-in safety belt assembly, it is not always possible to determine if the safety belt assembly was subject to a collision or if excessive forces had been exerted on the assembly.

In order to overcome the inability to determine whether or not a safety belt was worn during a collision, it is one of the primary objects of the present invention to provide a safety belt assembly which determines the amount of force exerted on the safety belt assembly.

An additional objective of the present invention is to provide the point in time when the excessive force was exerted on the safety belt assembly.

To achieve the foregoing objectives, the safety belt assembly according to the present invention includes a first and second plate associated with one another; a flat elongated biasing member associated with the plates for resiliently restraining relative movement and movably retaining the plates with respect to one another; a mechanism response to relative movement of the plates for enabling a determination of an amount of force exerted on the assembly; and a mechanism for securing the assembly with a conventional safety belt and buckle.

Also disclosed is a mechanism substantially similar to the above described assembly having a mechanism responsive to movement of the plates for indicating a point in time when a force was exerted on the assembly. Further, an assembly including both a mechanism for enabling a determination of an amount of force exerted on the assembly combined with a mechanism for indicating a point in time when a force was exerted on the assembly is disclosed.

From the following description and claims, taken in conjunction with the accompanying drawings, other objects and advantages of the present invention will become apparent to one skilled in the art.

BRIEF DESCRIPTION OF THE DRAWINGS

FIG. 1 is a perspective view of the safety belt assembly made in accordance with a first embodiment of the present invention.

FIG. 2 is an exploded view of FIG. 1.

FIG. 7 is an exploded perspective view of a safety belt assembly made in accordance with another embodiment of the present invention.

FIG. 8 is a cross-sectional view along lines 8—8 of FIG. 7 thereof.

FIG. 9 is a partial cross-sectional view of a safety belt assembly made in accordance with another embodiment of the present invention.

DETAILED DESCRIPTION OF THE INVENTION

Figure 3:
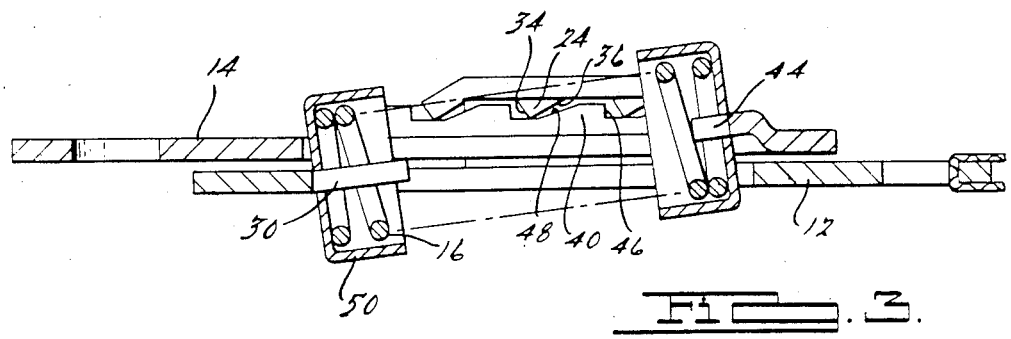
FIG. 3 is a cross-sectional view along lines 3—3 of FIG. 1.
Figure 4:
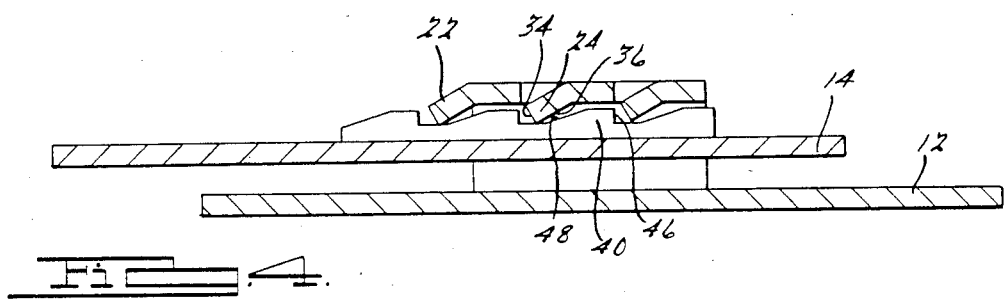
FIG. 4 is a cross-sectional view along lines 4—4 of FIG. 1.

A seat belt assembly for recording force exerted on the assembly is generally illustrated in FIGS. 1 and 2 and is designated with the reference numeral 10. The seat belt assembly 10 includes a first plate 12, a second plate 14 and a resilient biasing member 16. A pair of retainers 18 are on the first plate 12 for maintaining the second plate 14 in a movable relationship with the first plate 12.

The first plate 12 has an overall rectangular configuration as seen in FIG. 2. The retainers 18 extend vertically from the plate 12 forming a pair of guide walls for positioning the second plate 14 in a substantially parallel plane relationship with the first plate 12. The first plate 12 has an aperture 28, which has a tongue 30 projecting into the aperture 28, for positioning the biasing member 16 between the plates 12 and 14. The aperture 28 is preferably rectangular and is positioned between the retainers 18 on the first plate 12. A second aperture 29 is in the first plate 12 for securing the first plate 12 to a conventional automobile safety belt 32. The aperture 29 enables the safety belt 32 to be placed through the first plate 12 and attached to itself for permanently securing the first plate 12 on the belt 32.

The retainers 18 have a flange 20, extending horizontally from the retainers 18, which is substantially parallel to the first plate 12. The flanges 20 have at least one or more fingers 24 projecting from the interior surface of the flange 20. The flanges 20 have a descending tit 22 which substantially functions the same as the fingers 24 which will be further discussed herein.

The fingers 24, on the interior surface of the flange 20, descend at a desired angle. The fingers 24 are generally formed by a U-shaped cut in the flanges 20. The material within U-cut is bent downward towards the first plate 12 forming the fingers 24. The fingers 24 have a back stop 34 which enable one way movement of the second plate 14. The fingers 24 have an annular wall 36 which enable the second plate 14 to slide one way against the fingers 24 before the backstop 34 traps the second plate 14 prohibiting movement of the second plate in a reverse direction. The fingers 24 enable the second plate 14 to move incrementally in the first plate 12.

The tongue 30 projects annularly above the aperture 28. The tongue 30 acts as a stop to secure the biasing member 16 on the first plate 12 in the assembly 10. Also, if a force of extreme magnitude is applied to the assembly 10 the tongue 30 will come into contact with the second plate 14 prohibiting further movement of the second plate 14.

The second plate 14 has an overall rectangular configuration as best seen in FIG. 2. At least one or more fingers 40 project vertically from the second plate 14. The second plate 14 has an aperture 42 which has a tongue 44 projecting into the aperture 42. The aperture 42 is preferably rectangular and enables the resilient biasing member 16 to communicate with the first and second plates 12 and 14. A second aperture 45 is in the second plate 14 for securing the assembly 10 to a conventional buckle (not shown).

The fingers 40 include an inclined wall 48 and a backstop 46. The fingers 40 intermesh with the fingers 24 enabling the second plate 14 to move, in the direction of arrow A, incrementally in the first plate 12. The incremental movement occurs as follows. The inclined wall 48 slides against the wall 36 until backstop 46 passes the wall 36, wherein the backstop 46 comes into contact with the backstop 34. This abutting of the backstops 34 and 46 prohibits movement of the second plate 14 in a reverse direction. The intermeshing of fingers 24 with fingers 40 provides the assembly 10 with a ratchet interface between the two plates 12 and 14. Thus, as the second plate 14 moves, the fingers 40 will ratchet along fingers 24 incrementally moving the second plate 14 in the first plate 12.

The resilient biasing member 16, positioned between apertures 28 and 42, is in communication with the first and second plates 12 and 14, holding the plates 12 and 14 in a first relaxed position, as best seen in FIG. 1. The resilient biasing member 16 is preferably a helical spring. The biasing member 16 has a pair of caps 50, one on each end of the spring, for equal distribution of the spring force. The caps 50 have apertures 52 which enable the biasing member to be positioned on the tongues 30 and 44. The biasing member 16 supplies a resistive force to the plates 12 and 14 which keeps the fingers 24 and 40 in contact with one another.

Figure 5:
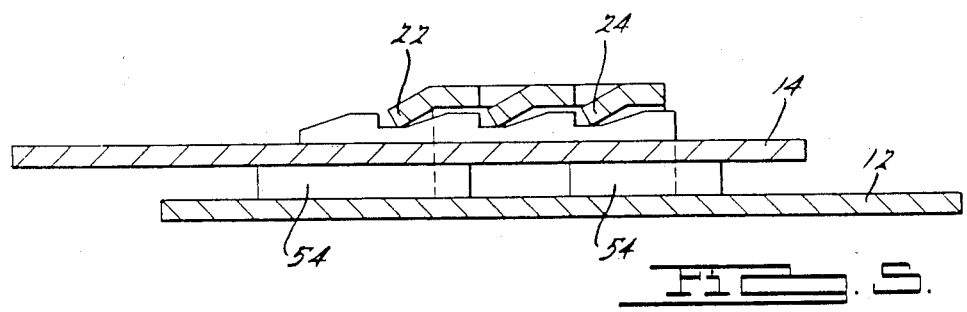
FIG. 5 is a cross-sectional view illustrating a time indicator made in accordance with the present invention.

The time indicator 54, best seen in FIG. 5, may be an electrical means, mechanical means, or a chemical means which will determine when a force was exerted on the safety belt assembly 10. An electrical means could include a starting mechanism and a conventional digital watch assembly having an elapsed time counter. Preferably, a chemical device is used which decays at a determined measurable rate. This decay provides the analyst with a simple determination as to when the force occurred from knowing the initial concentration, the decay rate and the remaining concentration of the chemical.

The time indicator 54 is positioned in communication with the plates 12 and 14. Preferably, the time indicator 54 would be positioned between plates 12 and 14 on one side of apertures 28 and 42. The time indicator 54 may be an encapsulated foam having an exterior coating and a predetermined amount of chemical within the foam. Once a force is exerted on the indicator 54, strong enough to break through the encapsulated coating, the chemical will begin to decay in the presence of atmospheric conditions. Thus, when analyzed, the time indicator 54 will determine when the excessive force was exerted on the safety belt assembly 10.

Figure 6:
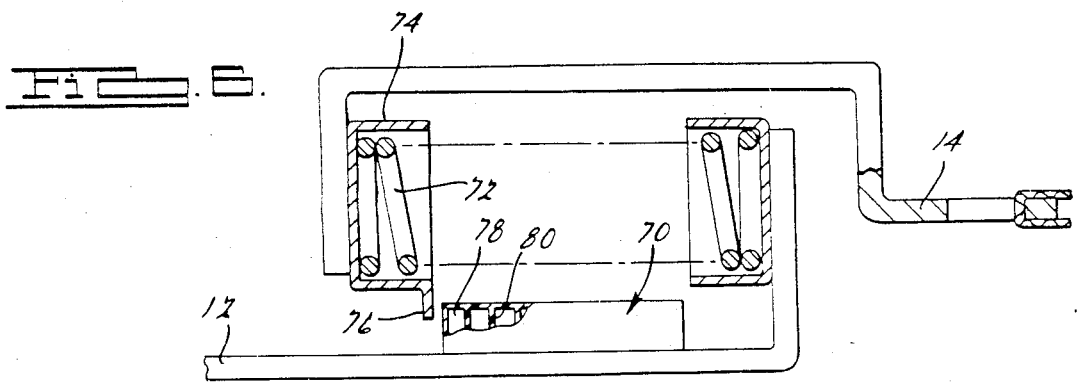
FIG. 6 is a cross-sectional view of a second embodiment of a time indicator made in accordance with the present invention.

In a second embodiment of the present invention, best seen in FIG. 6, the time indicator 7 is in communication with a biasing member 72. The biasing member 72, preferably a helical spring, has a housing 74 around its circumference. The housing 74 has a flange 76. In this embodiment the biasing member 72 returns to a relaxed position after every compression. The flange 76 is positioned in a line of contact with the time indicator 70 as the biasing member 72 is compressed. The time indicator 70 includes several encapsulated pockets 78. A wall 80 separates the pockets 78 from one another. As the biasing member 72 is compressed the flange 76 slides over the encapsulated time indicator 70. As this happens, the flange 76 breaks through the encapsulated coating, enabling individual pockets 78 of the time indicator 70 to decay. This breakthrough occurs through one pocket 78 at a time. Thus, as small forces are exerted on the assembly 10, the flange 76 may break through only one pocket 78. When an excessive force is exerted on the assembly 10, the flange 76 will break through several pockets 78. A decay analysis of the remaining chemicals in each pocket 78 will determine the time when each pocket 78 was broken. The more pockets 78 broken through at one time will indicate a large amount of force exerted on the assembly 10 at that time. Thus, the analyst will be able to determine when the force occurred. Also, the analyst will be able to determine the force exerted on the assembly by measuring the distance traveled by the biasing member 72 along the time indicator 70.

In the present invention the assembly 10 is assembled as shown in FIG. 1. The second plate 14 is secured, by aperture 44, in a conventional safety belt buckle (not shown). A force is exerted on the assembly 10 which has a magnitude large enough to activate the assembly 10. The second plate 14 slides, in the direction of arrow A, in the first plate 12. This slide measures the force exerted on the assembly and the point in time when the force was exerted.

The slide occurs as follows. The second plate fingers 40 are intermeshed with the first plate fingers 24. As the force is exerted, the second plate fingers 40 ratchet on the first plate fingers 24 moving, in the direction of arrow A, in accordance with the force exerted. The second plate back stop 46 comes into contact with a first plate back stop 34 halting the movement of the second plate 14 in a reverse direction. As this happens, the biasing member 16 compresses between the tongues 30 and 44 trapping the biasing member 16 in a compressed state. This compressed state records the force exerted on the assembly 10. Also, as the second plate 14 ratchets in the first plate 12, the time indicator 54 is activated. The second plate 14 compresses the encapsulated time indicator 54, breaking through the coating, exposing the chemical to atmospheric conditions, beginning chemical decay. The amount of decay is used to determine when the exertion of force occurred.

The force exerted will be measured by conventional spring equations since the spring constant and the linear displacement of the spring will be known. The time when the force was exerted will be determined by an analysis of the amount of the chemical remaining with respect to its known dissipation rate and the original chemical concentration.

Once the analyst has determined the amount of force exerted on the assembly 10, and at what point in time the force was exerted on the assembly 10 he may reset the assembly 10 for further use. This is done by replacing the time indicator 54 and resetting the biasing means 16 and fingers 24 and 40 back to their relaxed positions. Thus, the assembly 10 is ready to be reinstalled in a vehicle.

FIGS. 7-9 illustrate further embodiments of the present invention. Corresponding elements of the invention will be marked with reference numerals having primes, which relates to the same element as previously described.

Turning to FIGS. 7 and 8, another embodiment of a recording force seat belt assembly is illustrated and designated with the reference numeral 10'. The assembly includes a first plate member 110 associated with a second plate member 112, both of which, are, in turn, associated with a biasing member 114. A belt 32' is secured to the biasing member 114 for securing the assembly 10; to the safety belt 32'. An aperture 45' is positioned in the biasing member 114 and plate member 112 for enabling the assembly 10' to be secured to a conventional seat belt buckle and/or anchor (not shown).

The plate member 110 has an overall rectangular shape having a pair of guide walls 120 and 122 formed on the longitudinal edges of the plate member 110. A mechanism 124 projects from the plate 110 and couples the plate 110 with the biasing member 114. Generally, mechanism 124 is positioned on one of the lateral ends of the plate member 110. Also, the plate member 110 includes mechanisms 126 and 128 for restraining a timer member, described above, such as a chemical timer, which may also be used as a force indicator, or a force determining indicator 75, into the plate member 110.

The guide walls 120 and 122 project substantially perpendicular to the plate member 110 and have extending flanges 130 and 132 projecting substantially parallel to the plate member 110. The guide walls 120 and 122 enable the second plate member 112 to movably slide in the first plate member 110. The mechanism 124 is generally a projecting tab extending from the plate member 110 having a desired curvature for retainng the plate member 110 in an aperture 140 in the biasing member 114. The mechanisms 126 and 128, retaining the timer member or the force determining indicator in the first plate member 110, project from the plate member 110 and include flanges 142 and 144 for securing the timer member or force determining indicator within the plate member 110.

The plate member 112 includes guide members 150 and 152 projecting substantially perpendicular to the plate member 112 and having flanges 154 and 156 extending substantially parallel to the plate member 112. The guide members 150 and 152 enable the second plate member 112 to movably slide in the first plate member 110. A member 160 projects at a desired curvature from the plate member 112 enabling securement of the plate member 112 to the biasing member 114 via aperture 141.

The plate member 112 includes a wiper member 158 which strikes the force determining indicator or timer member of the first plate 110 for indicating the distance travelled by the biasing member 114 or starting the running of time when a force was applied to the assembly. The wiper member 158 depends from the bottom of the plate 112 and contacts the force indicator or timer member, as will be described herein. The biasing member 114 may be formed with any suitable metallic sheet material having requisite strength and resilient characteristics. The biasing member 114 has a desired width and thickness such that a desired spring constant may be obtained from the material. Generally, the width of the biasing member 114 controls the stiffness of the biasing member 114 for a given material thickness. The length of the biasing member 114 controls the longitudinal deflection of the biasing member 114, which occurs in two primary modes prior to failure. To increase longitudinal deflection to the biasing member 114 without increasing the overall non-deflected length of the biasing member, the width of the biasing member 114 may be increased, which, in turn, enables an increase in longitudinal deflection while maintaining a constant spring length during non-deflection. The biasing means 114 generally employs a width to thickness cross-section ratio of three or more. The spring may include several spring constants. One of the spring constants may be used as a shock absorbing feature having a substantially lower spring constant than the other spring constants. This lower spring constant reduces the rate of energy absorption by the device and thereby reducing the stresses applied to the buckled-in occupant.

Generally, the biasing member 114 has an overall flat, elongated, rectangular shape. The end portions 160 and 162 are integrally formed onto the ends of the biasing member 114. The end portions have means 164 and 45' for attaching the biasing member to a belt and/or anchor buckle, respectively. The biasing member 114 may be formed from a metallic strip by stamping or otherwise achieving a serpentine configuration into the strip. The achieving of the serpentine configuration removes portions of the strip from in between the curved U-shaped members of the serpentine configuration.

The serpentine configuration is formed from reversing U-shaped members 168 and 170 sharing a common leg with the next reversing U-shaped member. The serpentine configuration enables the biasing member 114 to deflect in a longitudinal axial direction. The reversing U-shaped members 168 and 170 include legs 172 and 174, base 176, and curvatures 178 and 180 connecting the legs 172 and 174 to the base 176. The width of the legs 172 and 174, base 176, and curvatures 178 and 180, along with the thickness of the strip, control the spring constant of the biasing member 114. Choosing the desired leg length, base, material, and thickness provides the spring with the desired spring constant pattern. A further explanation of the spring of the present invention is given in U.S. patent application Ser. No. 916,155, filed Oct. 7, 1986, entitled "Serpentine Strip Spring", the disclosure of which is herein expressly incorporated by reference.

FIG. 9 illustrates another embodiment of the present invention. In FIG. 9, the seat belt assembly 210 is modified to be secured by a fastening means 212, such as a bolt, to a vehicle floor pan 216. The biasing member 114 has an aperture for enabling the bolt 212 to pass therethrough securing the assembly 210 to vehicle floor pan 216. The assembly 210 is thus substantially the same as the assembly 10' above, and the element will be designated with the same reference numerals.

The seat belt assemblies 10' and 210 generally function as follows. The assemblies 10' and 210 are secured between two portions of a seat belt. When a force is exerted on the assemblies, the biasing member 114, if the force is large enough, begins to extend in a longitudinal direction. As this extension occurs, the wiper member 158 contacts the force indicator and/or timer member 75. If only a force determining indicator is used, the wiper member 158 will contact the force determining indicator 75 and a mark will be etched onto the indicator, indicating the longitudinal distance travelled by the spring. As explained above, using conventional spring equations, knowing the distance travelled by and the spring constant of the biasing member 114, the force exerted on the belt can easily be determined. When a timer member 75 is used, the timer member is activated, starting the running of time as the wiper member 158 contacts the timer member 75. Also, the force exerted may be determined from the distance travelled by the wiper along the timer member. Thus, by using a timer member 75, both the point in time when force was exerted on the assemblies 10' and 210 and also the amount of force which was exerted on the assemblies 10' and 210 may be determined.

While the above disclosure fulfills the embodiments of the present invention, it will become apparent to those skilled in the art that modifications, variations and alterations may be made without deviating from the scope and fair meaning of the subjoined claims.

What is claimed is:

1. A safety belt assembly for measuring force exerted on the assembly, the assembly comprising:
   a first and second member;
   a flat elongated biasing means in communicating with said first and second members for resiliently restraining relative movement and movably retaining said members with respect to one another;
   means responsive to relative movement of said first and second members for enabling a determination of an amount of force exerted on said assembly;
   means for securing said assembly into a buckle;
   means for securing said assembly onto a belt; and
   means for securing said assembly to a vehicle.

2. The safety belt assembly according to claim 1 wherein said biasing means including said means for securing said assembly onto said belt and buckle and a serpentine biasing portion is made from a metallic strip material.

3. The safety belt assembly according to claim 1 wherein said members being slideably associated with one another.

4. The safety belt assembly according to claim 3 wherein said means for determination of force further comprises wiper means and indicator means, said wiper means associated with said indicator means for enabling determination of a distance travelled by said biasing means in response to an exerted force.

5. A safety belt assembly for measuring the point in time when a force was exerted on the assembly, said assembly comprising:
   a first and second member;
   a flat elongated biasing means in communication with said first and second members for resiliently restraining relative movement and movably restraining said members with respect to one another;
   means responsive to relative movement of said first and second members for indicating a point in time when a force was exerted on said assembly; and
   means for securing said assembly onto a safety belt.

6. The safety belt assembly according to claim 5 wherein said biasing means further comprises means for securing said assembly onto a belt and buckle and a serpentine biasing portion force from a metallic strip material.

7. The safety belt assembly according to claim 5 wherein said members being slideably associated with one another.

8. The safety belt assembly according to claim 5 wherein said means for indicating the point in time when a force was exerted comprises a wiper means and a chemical means, said wiper means activating said chemical means such that said chemical means decays at a known pre-determined rate when exposed to atmospheric conditions.

9. A safety belt assembly for measuring the force exerted and indicating the point in time when a force wax exerted on the assembly, said assembly comprising:
   a first and second member;
   a flat elongated biasing means in communication with said first and second members for resilient restraining relative movement and movably retaining said first and second members with respect to one another;
   means responsive to relative movement of said first and second members for enabling a determination of an amount of force exerted on said assembly and for indicating a point in time when a force was exerted on said assembly;
   means for securing said assembly into a buckle; and
   means for securing said assembly onto a belt.

10. The safety belt assembly according to claim 9 wherein said biasing means includes said means for securing said assembly onto a belt and buckle and a serpentine biasing portion formed from metallic strip material.

11. The safety belt assembly according to claim 9 wherein said members being slideably associated with one another.

12. A safety belt assembly according to claim 11 wherein said means for determination of force and for indicating the point in time when a force was exerted further comprises a wiper member and a chemical means, said wiper member associated with said chemical means for enabling determination of a distance travelled by said biasing means in response to an exerted force and said wiper means activating said chemical means such that said chemical means decays at a known pre-determined rate when exposed to atmospheric conditions.

13. An assembly associated with a safety belt for measuring the force exerted and indicating the point in time when a foce was exerted on the assembly, said assembly comprising:
   a first and second member;
   a flat elongated biasing means in communication with said first and second members for resiliently restraining relative movement and movably retaining said first and second members with respect to one another;
   means responsive to relative movement of said first and second members for enabling a determination of an mount of force exerted on said assembly and for indicating a point in time when a force was exerted on said assembly; and
   means for operatively securing said assembly to a safety belt.

14. The safety belt assembly according to claim 13 wherein said baising means further comprises means for securing said assembly onto a belt and buckle and a serpentine biasing portion formed from metallic strip material.

15. The safety belt assembly according to claim 13 wherein said members being slideably associated with one another.

16. A safety belt assembly according to claim 15 wherein said means for determination of force and for indicating the point in time when a force was exerted comprises a wiper member and a chemical means, said wiper member associated with said chemical means for enabling determination of a distance travelled by said biasing means in response to an exerted force and said wiper means activating said chemical means such that said chemical means decays at a known pre-determined rate when exposed to atmospheric conditions.

* * * * *

UNITED STATES PATENT AND TRADEMARK OFFICE
CERTIFICATE OF CORRECTION

PATENT NO. : 4,805,467

DATED : February 21, 1989

INVENTOR(S) : Donald D. Bartholomew

It is certified that error appears in the above-identified patent and that said Letters Patent is hereby corrected as shown below:

Column 2, Line 50, "on" should be --onto--;

Column 2, Line 55, "tit" should be --tilt--;

Column 2, Line 61, after "within" insert --the--;

Column 2, Line 61, "U-cut" should be --U-shaped cut--;

Column 4, Line 4, "7" should be --70--;

Column 5, Line 10, "relates" should be --relate--;

Column 5, Line 19, "10;" should be --10' --;

Column 7, Line 67, "force" should be --formed--;

Column 8, Line 13, "wax" should be --was--;

Column 8, Line 16, "resilient" should be --resiliently--;

Column 8, Line 49, "foce" should be --force--;

Column 8, Line 59, "mount" should be --amount--.

Signed and Sealed this

Ninth Day of July, 1991

*Attest:*

HARRY F. MANBECK, JR.

*Attesting Officer*  *Commissioner of Patents and Trademarks*